(12) United States Patent
Dong

(10) Patent No.: US 6,466,435 B2
(45) Date of Patent: Oct. 15, 2002

(54) COMPUTER BEZEL HAVING PIVOTABLE DRIVE COVER

(75) Inventor: Li Dong, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/745,971

(22) Filed: Dec. 21, 2000

(65) Prior Publication Data
US 2002/0027771 A1 Mar. 7, 2002

(30) Foreign Application Priority Data
Sep. 1, 2000 (TW) ...................... 89215212 U

(51) Int. Cl.⁷ .............................. G06F 1/16
(52) U.S. Cl. .................... 361/685; 361/725; 312/332.1; 360/98.01
(58) Field of Search ................. 361/685, 684, 361/683, 686, 724–727; 312/332.1, 333; 360/97.01, 98.01, 137, 137 D

(56) References Cited

U.S. PATENT DOCUMENTS

| 5,822,183 A | * | 10/1998 | Kanda et al. | 361/684 |
| 5,933,328 A | * | 8/1999 | Wallace et al. | 361/737 |
| 6,122,173 A | * | 9/2000 | Felcman et al. | 361/726 |

* cited by examiner

Primary Examiner—Darren Schuberg
Assistant Examiner—Hung Van Duong
(74) Attorney, Agent, or Firm—Wei Te Chung

(57) ABSTRACT

A computer bezel includes a base (10) defining an opening (12) for providing access to a data storage device mounted in a computer, and a drive cover (14) pivotably attached to the base and received in the opening. A pair of posts (30) is formed in the base below the opening. Two arcuate arms (20) extend from an inner surface of the drive cover. Each arm defines a pivoting hole (22) at a free end thereof, for extension of the corresponding post of the base therethrough. A helical spring (32) encompasses each of the posts, and engages with the drive cover. The spring acquires elastic potential energy when the drive cover is rotated from a closed position to an open position.

13 Claims, 5 Drawing Sheets

COMPUTER BEZEL HAVING PIVOTABLE DRIVE COVER

BACKGROUND OF THE INVENTION

1. Field of the Invention

The present invention relates to a computer bezel, and particularly to a computer bezel having a pivotable drive cover.

2. The Related Art

A computer generally has a data storage device attached to a computer enclosure for storing and accessing data. The data storage device may be a floppy disk drive or a CD-ROM drive. A side panel or a top panel is detachable from the computer enclosure, for facilitating assembly of the data storage device to the computer enclosure. However, the side panel or top panel is usually attached to the computer enclosure with bolts. Thus assembly or disassembly of the data storage device is time-consuming and laborious.

To overcome the above problems, one kind of conventional computer enclosure has an opening in a bezel thereof. The bezel is mounted on a front panel of the enclosure, and a storage device is attached to the enclosure through the opening in the bezel. However, the opening in the bezel interrupts the otherwise perfect surface of the bezel, which detracts from the bezel's aesthetic appeal.

As a result, another kind of conventional enclosure has a door attached to the bezel and covering the opening of the bezel. However, the door must be manually opened and closed when gaining access to a data storage device within. This is inconvenient.

It is strongly desired to provide a computer bezel having a pivotable drive cover which overcomes the above problems encountered in the prior art.

SUMMARY OF THE INVENTION

Accordingly, an object of the present invention is to provide a computer bezel having a pivotable drive cover for facilitating assembly of a data storage device to a computer enclosure.

Another object of the present invention is to provide a computer bezel having a pivotable drive cover which cover does not require manual operation when gaining access to the data storage device within a computer enclosure.

A further object of the present invention is to provide a computer bezel having a pivotable drive cover which blends well with the aesthetic configuration of a computer enclosure.

To achieve the above-mentioned objects, a computer bezel in accordance with the present invention comprises a base defining an opening for providing access to a data storage device mounted in a computer, and a drive cover pivotably attached to the base and received in the opening. A pair of posts is formed in the base below the opening. Two arcuate arms extend from an inner surface of the drive cover. Each arm defines a pivoting hole at a free end thereof, for extension of the corresponding post of the base therethrough. A helical spring encompasses each of the posts of the base, and engages with the drive cover. The spring acquires elastic potential energy when the cover is rotated from a closed position to an open position.

Other objects, advantages and novel features of the present invention will be drawn from the following detailed embodiment of the present invention with attached drawings, in which:

DESCRIPTION OF THE PREFERRED EMBODIMENT

Figure 1:
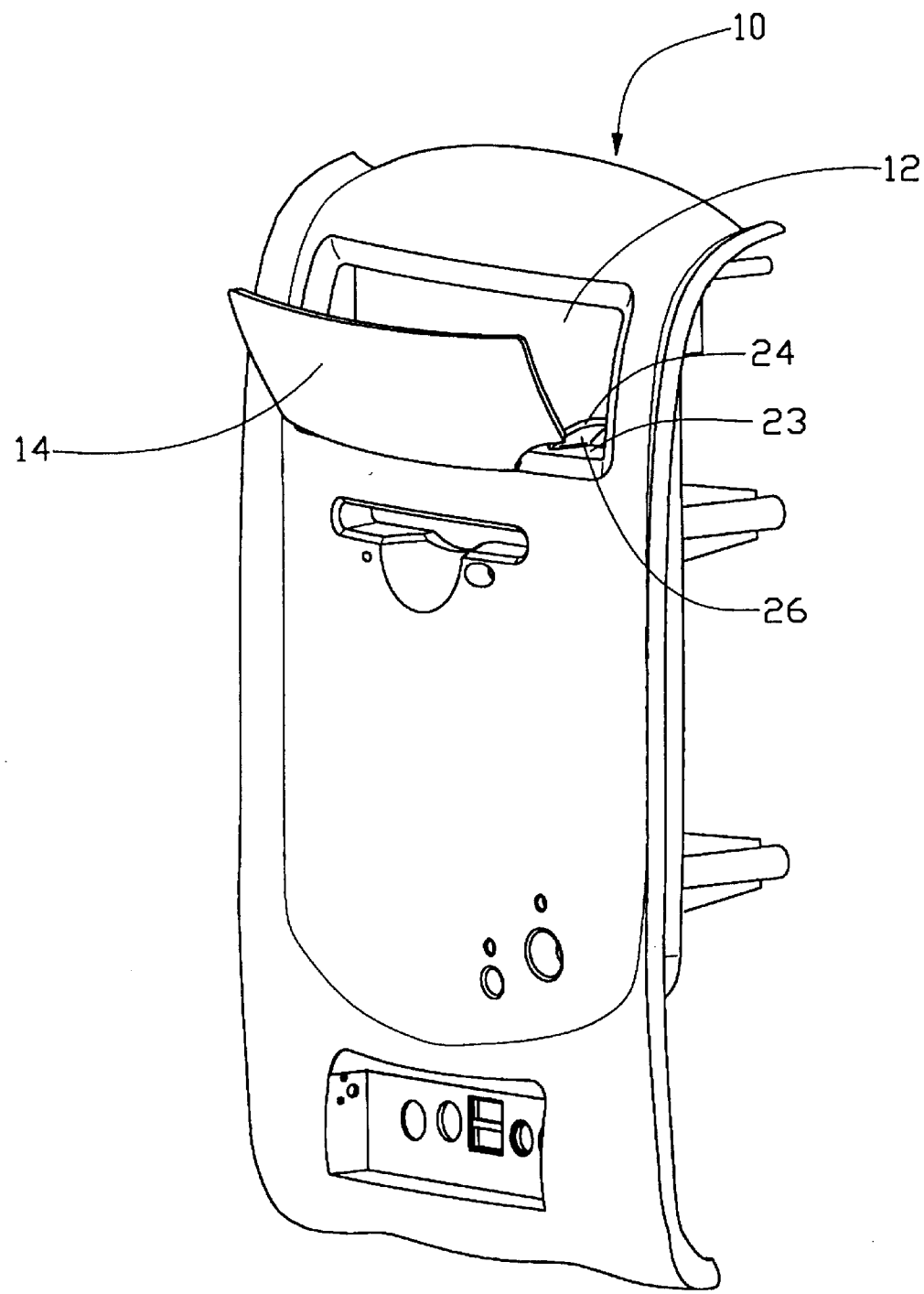
FIG. 1 is a perspective view of a computer bezel of the present invention, showing a drive cover thereof at a partly open position.
Figure 2:
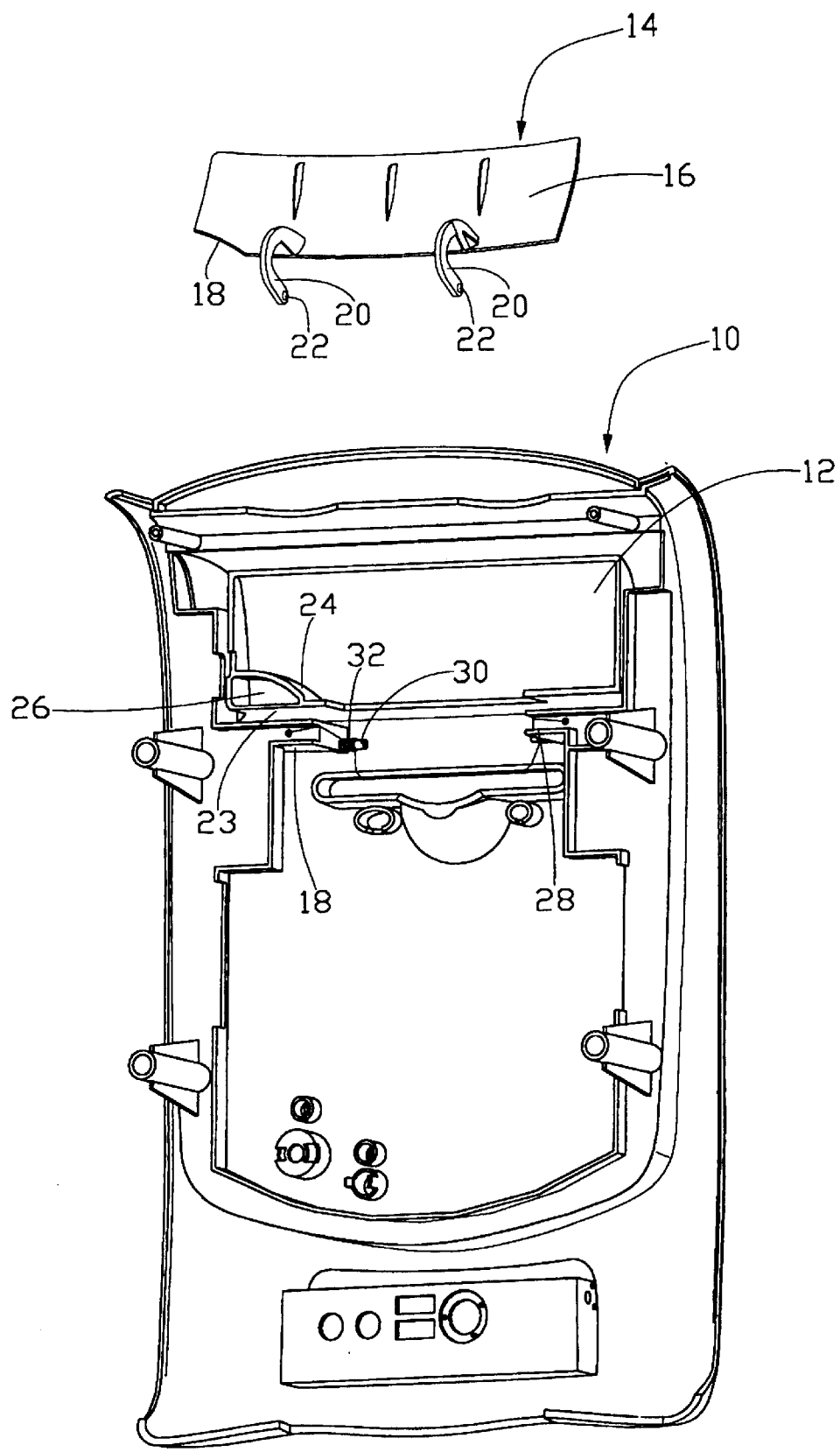
FIG. 2 is an exploded view of the computer bezel, viewed from a rear perspective.

Referring to FIGS. 1 and 2, a computer bezel constructed in accordance with the present invention comprises a base 10, and a drive cover 14 pivotally attached to the base 10.

An upper portion (not labeled) of the base 10 defines a substantially rectangular opening 12, for providing access to a data storage device 100. For convenience, the data storage device 100 will be designated as a CD-ROM drive for the purposes of the description which follows. The base 10 is bent inwardly adjacent a lower right corner of the opening 12, thereby forming a horizontal tab 23. A convex rib 24 is formed in a lower right-hand corner of the opening 12, extending between the tab 23 and an inner wall (not labeled) of the base 10. The rib 24, tab 23 and inner wall (not labeled) thereby form an aperture 26 for accommodating a button 102 of a CD-ROM drive 100. A pair of opposing horizontal plates 28 extends from an inner surface (not labeled) of the base 10 below the opening 12. A pair of opposing posts 30 extends inwardly toward each other from respective opposite plates 28. A helical spring 32 encompasses each post 30, and engages with the base 10 by conventional means.

The drive cover 14 comprises a body 16 and a pair of substantially U-shaped arcuate arms 20 extending from an inner surface of the body 16. The body 16 defines a cutout 18 dimensioned to the corresponding convex rib 24 of the base 10. Each arm 20 defines a pivoting hole 22 at a free end thereof, for extension of the corresponding post 30 of the base 10 therethrough.

Figure 3:
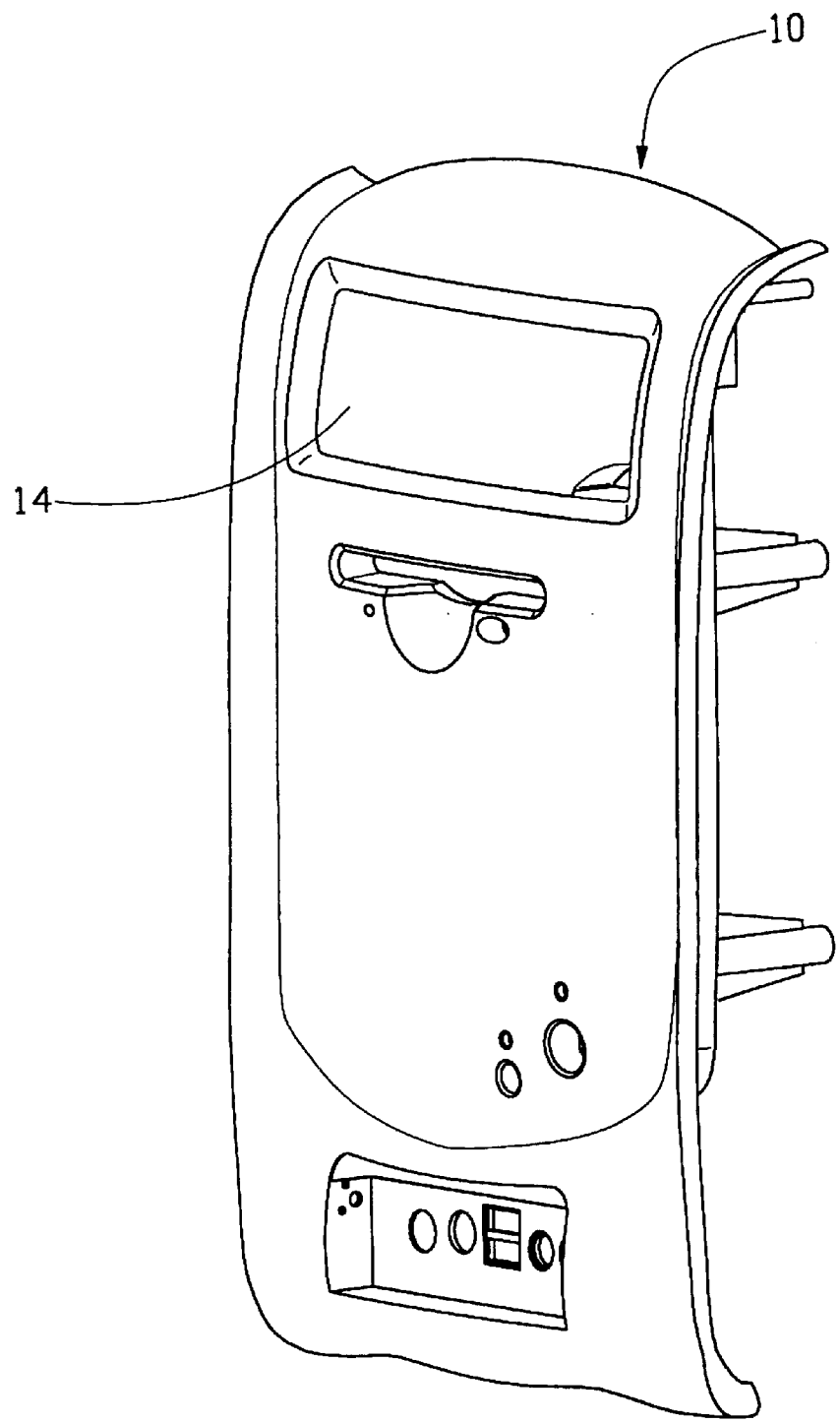
FIG. 3 is similar to FIG. 1, but showing the drive cover in a closed position.

Referring additionally to FIG. 3, in assembly, the drive cover 14 is received in the opening 12 of the base 10, with the posts 30 of the base 10 inserting into the corresponding pivoting holes 22 of the drive cover 14. An inner end of the spring 32 on each post 30 engages with the corresponding arm 20 of the drive cover 14 by conventional means. The cutout 18 of the drive cover 14 frames the convex rib 24 and the aperture 26 of the base 10. The button 102 of the CD-ROM drive 100 is assembled in the aperture 26 of the base 10. Thus, the drive cover 14 covers the opening 12 of the base 10 in a closed position (see FIG.3).

Figure 4:
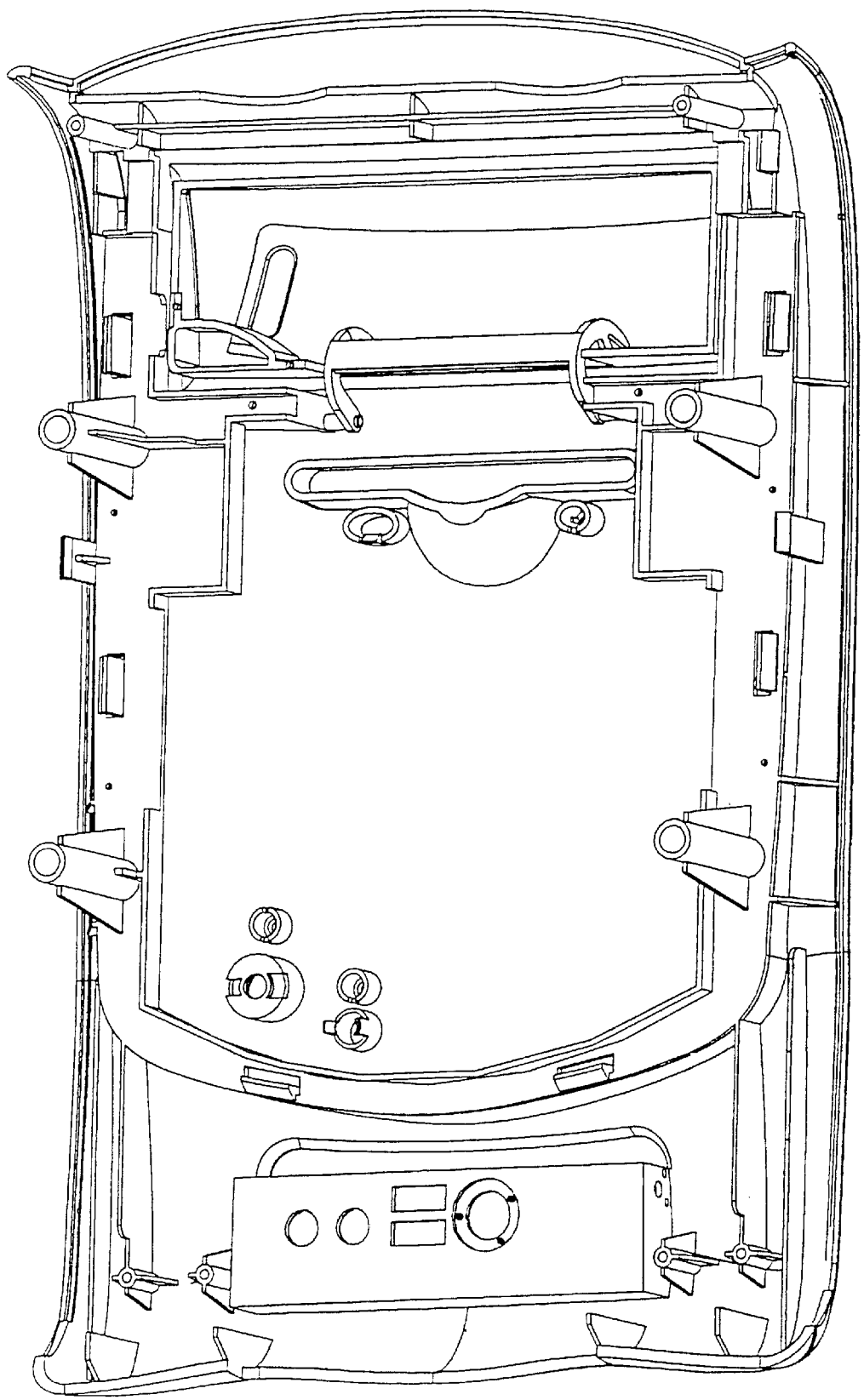
FIG. 4 is a rear perspective view of another similar embodiment of the computer bezel to show how the drive cover may be pivotal about the posts and slantingly extends forwardly without interference with the base, when the drive cover is moved from a closed position to a partly open position.
Figure 5:
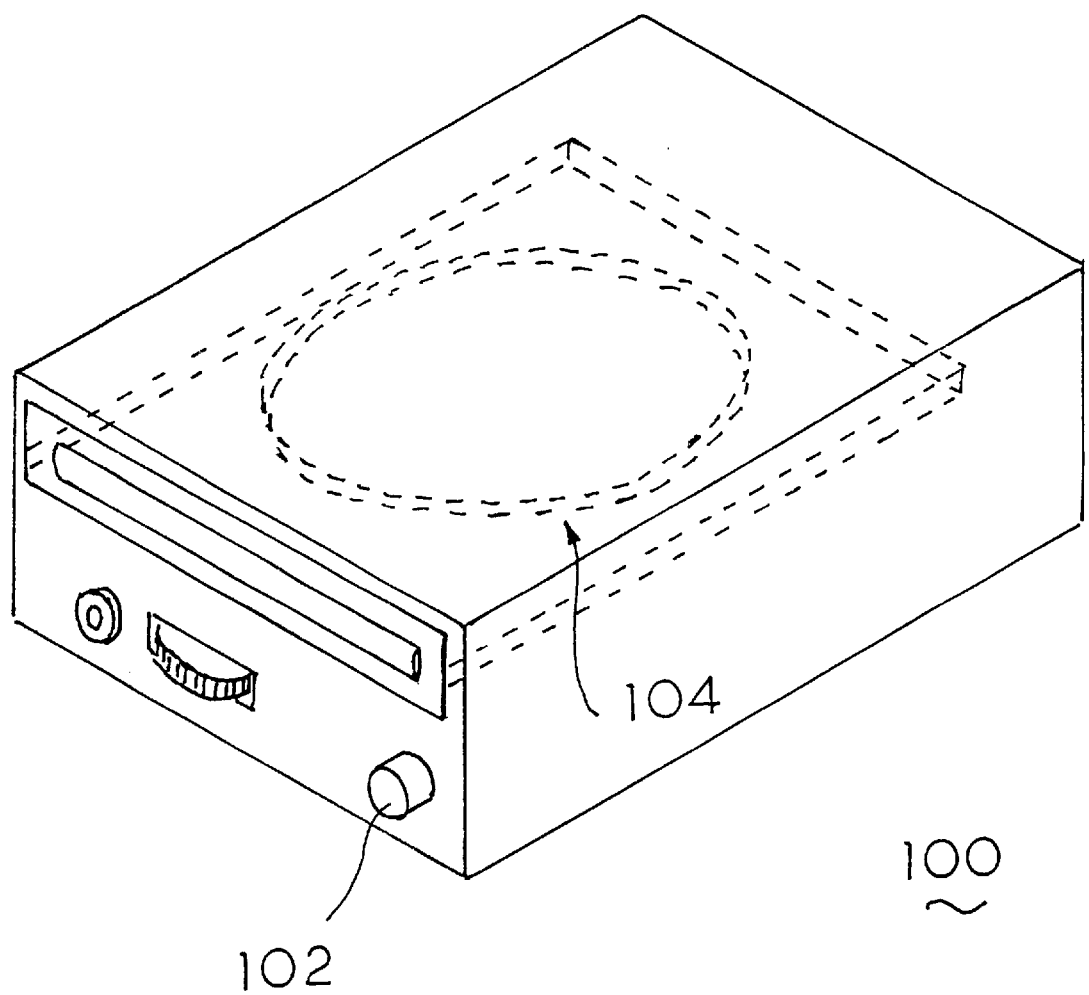
FIG. 5 is a perspective view of the CD drive for use with the drive cover of FIG. 1.

Further referring to FIGS. 4 and 5, when the button 102 is pushed, the CD-ROM drive 100 is actuated. The tray 104 of the CD-ROM drive 100 moves toward the outside of the base 10, and pushes against the inner surface of the body 16 of the drive cover 14. This forces the drive cover 14 to rotate about the posts 30 from the closed position to an open position thereby allowing user access to the CD-ROM drive tray 104. During the rotation of the drive cover 14 about the posts 30, the springs 32 are torsionally deformed. Thus in the open position, the springs 32 retain elastic potential energy. When the button 102 of the CD-ROM drive 100 is pushed again, the tray 104 returns to its original position within the CD-ROM drive 100. The elastic potential energy of the springs 32 causes the drive cover 14 to rotate about the posts 30 from the open position to the closed position. The drive cover 14 thereby covers the opening 12 of the base 10 once again. Thus the drive cover 14 is readily opened or closed in cooperation with use of the CD-ROM drive 100.

It is understood that the invention may be embodied in other forms without departing from the spirit thereof. Thus, the present example and embodiment is to be considered in all respects as illustrative and not restrictive, and the invention is not to be limited to the details given herein.

What is claimed is:

1. A computer bezel comprising:
    a base defining an opening for providing access to a data storage device and forming two posts; and
    a drive cover pivotably attached to the base and received in the opening, the drive cover defining two pivoting holes for extension of the respective posts therethrough, the drive cover being adapted to cover the data storage device and being driven by the data storage device from a closed position to an open position.

2. The computer bezel as claimed in claim 1, wherein two arcuate arms extend from an inner surface of the drive cover, and wherein the two pivoting holes are respectively defined in the distal ends of the arms.

3. The computer bezel as claimed in claim 1, wherein a spring member is associated with at least one of the posts of the base, and wherein the spring member engages with the drive cover for providing elastic force to the drive cover when the cover is rotated from the closed position to the open position.

4. The computer bezel as claimed in claim 3, wherein the spring member comprises a helical spring encompassing the post.

5. An operation arrangement of a data storage device in the computer, comprising:
    a data storage device including a moveable tray;
    a computer bezel including:
    a base defining an opening generally in alignment with the tray in a front-to-back direction;
    a drive cover pivotably attached to the base and covering the opening and the associated data storage device behind said opening; wherein
    when the tray is positioned within the data storage device, said drive cover is generally in a closed position to shield the data storage device behind the opening, while when the tray is actuated to move forwardly for loading or unloading the disc thereto, said drive cover is forwardly pushed by the forward moving tray to be in an open position which allows the tray to extend forwardly beyond the rotated drive cover.

6. The arrangement as claimed in claim 5, wherein the data storage device includes a button to actuate the tray to move.

7. The arrangement as claimed in claim 5, further including spring means for keeping the drive cover in a closed position when the tray is received in the data storage drive.

8. The arrangement as claimed in claim 5, wherein said drive cover includes a pair of U-shaped arms to connect to posts formed on an inner surface of the base for pivotal movement with regard to the base.

9. The arrangement as claimed in claim 5, wherein the drive cover extends vertically in said closed position.

10. The arrangement as claimed in claim 6, wherein said drive cover defines a cutout to expose the said button for easy access from an exterior when said drive cover is in a closed position.

11. A method of operating a CD drive in a computer, comprising the steps of:
    providing a CD drive with a moveable tray;
    (A) providing a bezel with a base defining an opening in alignment with the tray;
    (B) providing a drive cover pivotable with the base and covering said opening;
    (C) providing means for urging the drive cover to cover said opening; wherein
    the drive cover is rotated forwardly by the forwardly moving tray in an open position for exposing the tray and loading a CD thereinto or unloading the CD therefrom; the drive cover is rotated rearwardly from the open position to a closed position by said means when the tray is moved rearward back into the CD drive.

12. The method as claimed in claim 11, wherein said CD drive includes a button to actuate the CD drive to move.

13. The method as claimed in claim 12, wherein said drive cover defines a cutout to expose said button for easy access from an exterior.

* * * * *